United States Patent [19]

Andrews et al.

[11] Patent Number: 4,866,133

[45] Date of Patent: * Sep. 12, 1989

[54] SOLID SOLUTIONS OF POLYMERIC PHENOLS AND POLYAMINES AS EPOXY CURING AGENTS

[75] Inventors: Christopher M. Andrews; Madan M. Bagga, both of Cambridge, England

[73] Assignee: Ciba-Geigy Corporation, Hawthorne, N.Y.

[*] Notice: The portion of the term of this patent subsequent to Apr. 21, 2004 has been disclaimed.

[21] Appl. No.: 95,725

[22] Filed: Sep. 14, 1987

[30] Foreign Application Priority Data

Sep. 24, 1986 [GB] United Kingdom ................ 8622998

[51] Int. Cl.$^4$ .............................................. C08G 59/58
[52] U.S. Cl. .................................... 525/109; 525/118; 525/113; 525/379; 525/381; 525/382; 525/481; 156/307.1; 156/330
[58] Field of Search .......................... 525/109, 481; 156/307.1, 330

[56] References Cited

U.S. PATENT DOCUMENTS

| | | | |
|---|---|---|---|
| 3,200,172 | 8/1965 | Renner | 525/507 |
| 3,519,576 | 7/1970 | Johnson | 528/99 |
| 3,520,905 | 7/1970 | Johnson | 549/406 |
| 3,956,241 | 5/1976 | Steele et al. | 528/117 |
| 4,659,779 | 4/1987 | Bagga et al. | 525/118 |

FOREIGN PATENT DOCUMENTS

| | | | |
|---|---|---|---|
| 237471 | 5/1959 | Australia | 525/481 |
| 48216 | 4/1980 | Japan | 525/109 |
| 0057711 | 4/1982 | Japan | 525/481 |
| 182316 | 12/1982 | Japan | 525/109 |
| 1293251 | 12/1986 | Japan | 525/109 |
| 740923 | 11/1955 | United Kingdom . | |
| 789475 | 1/1958 | United Kingdom . | |
| 813972 | 5/1959 | United Kingdom . | |
| 872797 | 7/1961 | United Kingdom . | |
| 991054 | 5/1965 | United Kingdom . | |
| 1408105 | 10/1975 | United Kingdom . | |
| 1462536 | 1/1977 | United Kingdom . | |
| 1556988 | 12/1979 | United Kingdom . | |
| 2031898 | 4/1980 | United Kingdom . | |
| 2055843 | 3/1981 | United Kingdom . | |
| 2103621 | 2/1983 | United Kingdom . | |

OTHER PUBLICATIONS

Lee and Neville, p. 2-2, *The Handbook of Epoxy Resins*, 1967.

*Primary Examiner*—John Kight
*Assistant Examiner*—Frederick Krass
*Attorney, Agent, or Firm*—Harry Falber

[57] ABSTRACT

Curable liquid compositions comprise
(A) a liquid epoxide resin and
(B) as curing agent for (A), more than 10% by weight, based on the weight of (A), of a solid solution of a polymeric phenol, such as a polymer of p-vinyl phenol or a phenolic novolak resin, and a polyamine having at least one primary amine group, such as diethylenetriamine or triethylenetetramine, the solid solution (B) being disposed as a powder in the epoxide resin. The compositions are useful as adhesives.

20 Claims, No Drawings

SOLID SOLUTIONS OF POLYMERIC PHENOLS AND POLYAMINES AS EPOXY CURING AGENTS

This invention relates to curable compositions which are particularly suitable for use as adhesives and to the heat curing of such compositions.

Curable compositions comprising an epoxide resin and a curing agent (hardener) therefor have been known for several decades. Many hardeners are reactive with an epoxide resin at room temperature and so need to be mixed with the resin just prior to use. Others, known as 'latent' hardeners, are stable in admixture with the epoxide resin at ambient temperature and effect hardening only when heated over a certain 'threshold temperature'.

The use of salts of monomeric polyhydric phenols with polyamines as latent curing agents for epoxide resins is described in U.S. Pat. Nos. 3,519,576 and 3,520,905. In these patents, preferred polyamines are said to be those which, when mixed as free amines with epoxide resins, effect rapid cure at room temperature, such as 1,3-propanediamine, ethylenediamine, diethylenetriamine and triethylenetetramine. Polyhydric phenols said to be suitable include resorcinol, bisphenol A (2,2-bis(4-hydroxyphenyl)propane) and 4,4'-dihydroxybiphenyl.

Adhesive compositions containing a solid epoxy resin, a salt of 1 mole of ethylenediamine, 1 mole of bisphenol A and 2 g of N,N'-dimethyl-1,3-diaminopropane, an ABS graft polymer and a copolymer of ethylene, acrylic acid and an acrylate are described in British patent specification No. 1,156,988. The composition, curing at temperatures between 80° and 100° C., are stated to be particularly suitable for bonding plastics with low softening points.

There is still a need for latent curable liquid epoxide resin compositions which exhibit both prolonged storage stability and also rapid cure at temperatures from 60° to 120° C. It has now been found that such compositions can be provided by using as latent curing agent a solid solution of a polymeric polyhydric phenol with a polyamine.

The provision of one-part liquid epoxide resin compositions which have prolonged storage stability yet cure rapidly at such low temperatures presents a difficult technical problem because storage stability and rapid curability are particularly conflicting requirements in the context of liquid epoxide compositions. Although it was proposed many years ago, in British Patent Specification No. 872,797 and U.S. Pat. No. 3,200,172, to use solid solutions of novolaks with amines in hardening solid epoxide compositions for use as moulding powders, there has been no proposal to use such solid solutions as hardeners in liquid epoxide resin compositions.

Accordingly the present invention provides a curable liquid composition comprising
(A) a liquid epoxide resin and
(B) as curing agent for (A), more than 10% by weight, based on the weight of (A), of a solid solution of a polymeric phenol and a polyamine having at least 2 amino groups, at least one of which is a primary amino group, said solid solution being dispersed as a powder in the epoxide resin.

The term 'solid solution' indicates a combination of the polyamine and the polymeric phenol in a single solid phase. It is possible that there is some salt formation between the two components. It is also possible that there is hydrogen bonding between them. Such solid solutions are usually made using nonstoichiometric quantities of the components and so they will usually contain one component in excess of the other. The term 'solid solution' covers all such products, whether containing salts of the polyamine and the phenolic polymer and whether containing an excess of either component.

Epoxide resins (A) employed in the compositions of the invention are preferably those containing at least two groups of formula

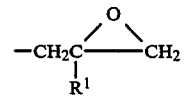   I directly attached to an atom or atoms of oxygen, nitrogen, or sulphur, where $R^1$ denotes a hydrogen atom or a methyl group.

As examples of such resins may be mentioned polyglycidyl and poly(beta-methylglycidyl) esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic carboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(beta-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. They may also be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)methane, 2,2-bis(4-hydroxyphenyl)propane, 2,2-bis(3,5-dibromo-4-hydroxyphenyl) propane, and low molecular weight novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert-butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, m-xylylenediamine, and bis(4-methylaminophenyl)methane; triglycidyl isocyanurate; and N,N'-diglycidyl derivatives of cyclic alkylene ureas such as ethyleneurea and 1,3-propyleneurea, and of a hydantoin such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Epoxide resins having the 1,2-epoxide groups attached to different kinds of hetero atoms may be employed, e.g., the N,N,O-triglycidyl derivative of 4-aminophenol, the glycidyl etherglycidyl ester of salicylic acid, N-glycidyl-N'-(2-glycidyloxypropyl)-5,5-dimethylhydatoin, and 2-glycidyloxy-1,3-bis(5,5-dimethyl-1-glycidylhydantoin-3-yl)propane.

If desired, a mixture of epoxide resins may be used.

Preferred epoxide resins are polyglycidyl ethers, polyglycidyl esters, N,N'-diglycidylhydantoins, and poly(N-glycidyl) derivatives of aromatic amines. Specific preferred resins are polyglycidyl ethers of 2,2-bis(4-hydroxyphenyl)propane, of bis(4-hydroxyphenyl)methane, or of a low molecular weight novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-(diglycidylamino)-phenyl)methane, and p-(diglycidylamino)phenyl glycidyl ether.

The solid solution (B) used as curing agent in the compositions of the invention is prepared and powdered prior to admixture with the resin (A). If the solid solution is not prepared prior to admixture with the resin, but an attempt is made to prepare it in situ in the epoxy resin, generally a storage stable mixture is not obtained.

The polymeric phenols used to prepare the solid solutions (B) are materials having, per average molecule, more than two repeating units having at least one phenolic hydroxyl group per unit. SUch polymeric materials are preferably homopolymers or copolymers of a phenol substituted by a polymerisable ethylenically unsaturated group or phenolic novolak resins.

As examples of polymers of unsaturated phenols there may be mentioned homopolymers of allyl-substituted phenols, such as 2-allylphenol and 4-allylphenol; homopolymers of phenols having substituents containing acrylic unsaturation, for example phenols which are the reaction products of an acid halide of a phenolic hydroxyl group-containing carboxylic acid such as salicylic acid or p-hydroxybenzoic acid with a hyroxyalkyl acrylate or methacrylate such as 2-hydroxyethyl methacrylate; homopolymers of vinyl- or 1-propenyl-substituted phenols such as o-vinylphenol, m-vinylphenol, p-vinylphenol and halogenated derivatives thereof, and o-(1-propenyl)phenol, m-(1-propenyl)phenol, p-(1-propenyl)phenol and halogenated derivatives thereof; copolymers of any of the above-mentioned phenols with at least one other polymerisable ethylenically unsaturated material, for example a styrene such as styrene itself, alpha-methylstyrene, 4-bromostyrene and 4-methylstyrene, an acrylic ester such as an alkyl acrylate or methacrylate or a hydroxyalkyl acrylate or methacrylate, or a vinyl ester such as vinyl acetate; and mixtures of two or more of the abovementioned homopolymers and/or copolymers. The homopolymers and copolymers of unsaturated phenols can be prepared using conventional polymerisation techniques, either from the unsaturated phenols themselves or from their esters or ethers. When the esters or ethers are used, the resulting polymers can be hydrolysed to convert the ester or ether groups to free phenolic hydroxy groups.

Preferred polymers of unsaturated phenols are those of the general formula

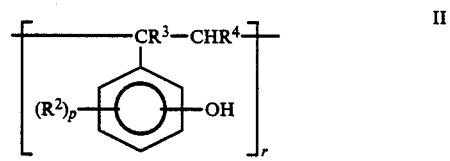

where
$R^2$ represents a halogen atom or a hydrogen, alkyl, alkoxy aryl, aralkyl or hydroxyaralkyl group,
$R^3$ and $R^4$ are the same or different and represent hydrogen atoms or straight chain or branched alkyl groups having from 1 to 4 carbon atoms,
p represents zero or an integer of from 1 to 4,
r represents an integer such that the average molecular weight of the polymer is within the range 1500–30,000.

Preferred polymeric phenols of formula II are those wherein $R^2$ represents a halogen atom, $R^3$ and $R^4$ represent hydrogen, and p represents zero or 1. The indicated —OH group is preferably para to the group

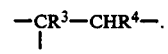

Such polymeric phenols are commercially available.

Other preferred polymers of unsaturated phenols are copolymers containing units of formula

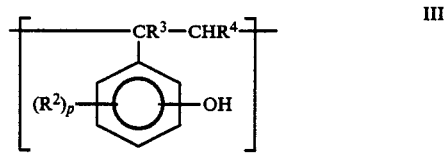

where $R^2$, $R^3$, $R^4$ and p are as hereinbefore defined, and units derived from an alkyl or hydroxyalkyl acrylate or methacrylate, the copolymers generally having average molecular weights from 1500 to 30,000. Examples of such copolymers are those having units of formula III where $R^2$ represents a halogen atom, $R^3$ and $R^4$ represent hydrogen and p represents zero or 1, and units derived from methyl methacrylate or hydroxyethyl methacrylate as comonomer.

Suitable phenolic novolak resins are those prepared from a mononuclear phenol, including phenol itself and alkyl-substituted mononuclear phenols, and an aldehyde such as acetaldehyde, benzaldehyde, furfuraldehyde or, preferably, formaldehyde. Preferred novolaks derived from mononuclear phenols are of formula

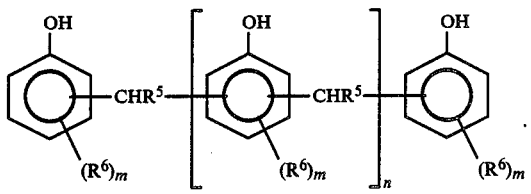

(IV)

where
$R^5$ represents a hydrogen atom or an alkyl or aryl group
$R^6$ represents an alkyl group of 1 to 10 carbon atoms,
m represents zero or an integer of 1 to 3, and
n represents an integer having an average value within the range 1 to 20.

Preferred polymeric phenols of formula IV are those where n denotes an integer having an average value from 1 to 10, $R^5$ represents hydrogen, and m denotes zero, in which case $R^6$ is absent or m denotes 1 and each $R^6$ denotes an alkyl group of 1 to 4 carbon atoms, or m denotes zero for some of the indicated aromatic rings in formula IV and denotes 1 for the remainder, $R^6$ denoting an alkyl group of 1 to 4 carbon atoms. Particularly preferred mononuclear phenol-aldehyde novolak resins are phenolformaldehyde and p-cresol-formaldehyde resins.

Other suitable phenolic novolak resins are those prepared from a polynuclear phenol, particularly a bisphenol, and an aldehyde such as acetaldehyde, benzaldehyde, furfuraldehyde or, preferably, formaldehyde. Suitable bisphenols form which such resins may be derived include bis(4-hydroxyphenyl)methane, 4,4'-dihydroxydiphenyl, bis(4-hydroxyphenyl)sulphone, 4,4'-dihydroxy-benzophenone and, preferably, 2,2,-bis(4-hydroxyphenyl)propane (bisphenol A). Particularly preferred bisphenol-aldehyde novolak resins are those prepared from bisphenol A and formaldehyde.

Compositions containing a solid solution having a bisphenol novolak resin as the phenolic component have been found to exhibit the surprising combination of prolonged storage stability with ability to cure rapidly at temperatures as low as 60° C.

Polyamines suitable for use as the polyamine component of the solid solution (B) are, in general, those having at least 2 amines groups which together contain at least 2, preferably at least 3, active hydrogen atoms, at least one of the amine groups being a primary amine group. Amongst these amines, those having at least 2 primary amine groups, are preferred. Thus preferred polyamines include polyalkylenepolyamines, for example polyethylenepolyamines and polypropylenepolyamines such as diethylenetriamine, triethylenetetramine, tetraethylenepentamine, pentaethylenehexamine, and dipropylenetriamine; aralkylenediamines such as xylylenediamines; aminoalkylalkylenediamines such as N-(2-aminoethyl)-1,3-propanediamine, N-(3-aminopropyl)-1,3-propanediamne, and N-(2-aminoethyl)-1,4-butanediamine; N,N-bis(aminoalkyl)alkylamines such as N,N-bis(2-aminoethyl)ethylamine, N,N-bis(3-aminopropyl) ethylamine and N,N-bis(3-aminopropyl)methylamine; tris(aminoalkyl) amines such as tris(2-aminoethyl)amine and tris(3-aminopropyl)amine; cycloaliphatic diprimary amines such as bis(4-aminocyclohexyl)methane, 2,2-bis(4-aminocyclohexyl)propane, 2,2-bis(4-amino-3-methylcyclohexyl)propane and isophoronediamine (3-aminomethyl-3,5,5-trimethylcyclohexylamine); N-aminoalkylpiperazines such as N-(2-aminoethyl)piperazine and N-(3-aminopropyl)piperazine; polyalklyleneimines such as polyethyleneimines; and polyaminoamides, for example those formed from aliphatic polyamines such as the polyalkylene polyamines mentioned above, and dimerised or trimerised fatty acids such as dimerised or trimerised linoleic and ricinoleic acids.

Particularly preferred polyamines are diethylenetriamine, triethylenetetramine, dipropylenetriamine, m-xylylenediamine, N-(2-aminoethyl)-1,3-propanediamine, N,N-bis(3-aminopropyl)methylamine, tris(2-aminoethyl)amine, bis(4-aminocyclohexyl)methane, isophoronediamine, N-(2-aminoethyl)piperazine, a polyethyleneimine having a molecular weight of 1650 to 1950 and a polyaminoamide formed from triethylenetetramine and dimerised linoleic acid.

Mixtures of two or more of the above polyamines can be used. Indeed, it is a further advantage of the present invention that it permits the use, where desired, of a solid solution curing agent derived from a mixture of basic components, thereby offering the possibility of modifying the physical properties, such as flexibility, of the cured composition by choice of appropriate amines and their relative amounts.

The solid solution (B) may be prepared simply by heating the polymeric phenol and the polyamine together until a clear liquid is obtained and then cooling to form a solid product. Alternatively, the polymeric phenol may be dissolved in a lower alcohol, usually methanol, ethanol or isopropanol, or a hydrocarbon such as toluene, at ambient or moderately elevated temperature, and the polyamine, which may also be in solution in such a solvent, added gradually to the resulting solution. The precipitate which forms is filtered off, washed and dried. Whichever method of preparation is used, the dried product is converted into a powder before use as a curing agent in the composition of the invention.

Generally the solid solution is ground to a fine powder, that is a powder having a particle size finer than 100 mesh (0.15 mm), for example about 200 mesh (0.07 mm), before being mixed with other components of the curable liquid composition. Coarser particles of the solid solution can usually be included in the composition since mixing of the components of the composition is conveniently carried out using conventional mixing equipment such as roll mills, which mixing can effect a reduction in the particle size.

The weight ratio of polymeric phenol to polyamine in the solution (B) is chosen to give a solid, stable product and is generally within the range 0.5:1 to 5:1, preferably within the range 1:1 to 4:1.

The curable compositions of the invention generally contain the solid solution (B) in an amount of 15 to 150%, preferably 15 to 120% and especially 20 to 80%, by weight of the epoxide resin (A).

Additives that may be incorporated into the compositions in order to improve their physical or chemical properties in the cured or uncured state include for example pigments, dyes, flexibilisers, plasticisers, fillers, thixotropic agents and fire retardants. Suitable polymeric materials which can be added as toughening agents include acrylic esters of epoxide resins, polyurethane prepolymers, blocked polyisocyanates and elastomeric butadiene polymers.

The curable liquid compositions of the invention may vary from unfilled compositions of low viscosity, for instance compositions containing reactive diluents, for example monoglycidyl ethers such as cresyl glycidyl ether, to pastes which can contain large amounts of fillers or other additives.

Compositions of the invention may be cured by heating to relatively moderately elevated temperatures. For instance, those containing a solid solution (B) having a bisphenol novolak phenolic component can be cured rapidly at temperatures as low as 60° C., while others can be cured rapidly at temperatures from 80° C. upwards. Temperatures up to 200° C. can be used to effect extremely rapid cure, particularly with compositions containing up to 50 parts of (B) per 100 parts of (A). In general, the compositions are cured by heating at temperatures from 60° C. to 200° C., preferably from 80° C. to 150° C., and especially from 80° C. to 120° C. Cure may be effected in less than one minute, but the heating can be continued for up to 3 hours to improve the physical properties of the cured product.

The curable compositions may be used as coating or laminating resins or, more particularly, as casting resins or adhesives. The invention accordingly provides also a method of bonding or sealing two surfaces together which comprises applying a composition of the invention to one or both surfaces, placing the two surfaces together with the composition positioned therebetween and heating the resulting assembly until the composition is cured. This method may be used with surfaces of metal, such as steel or aluminium, plastic materials, glass, friction materials such as brake linings, and ceramic materials. It is particularly useful where both surfaces are of metal.

The invention is illustrated by the following Examples.

The polymeric phenols used to prepare the curing agents (hardeners) which are used in these Examples are as follows:

Polymeric Phenol I denotes a novolak prepared from bisphenol A and formaldehyde in the molar ratio 1:0.85 and melting in the range 125°-132° C.

Polymeric Phenol II denotes a novolak prepared from phenol and formaldehyde in the molar ratio 1:0.89 and melting in the range 70°-90° C.

Polymeric Phenol III denotes a novolak prepared from bisphenol A and formaldehyde in the molar ratio 1:0.46 and melting at 90° C.

Polymeric Phenol IV denotes a novolak prepared from phenol and formaldehyde in the molar ratio 1:0.915 and melting in the range 100°-110° C.

Polymeric Phenol V denotes a novolak prepared from p-cresol and formaldehyde in the molar ratio 1:1.27 and melting in the range 120°-130° C.

Polymeric Phenol VI denotes a poly(p-vinylphenol) having a weight average molecular weight of 5000 and available from Maruzen Oil Co. Ltd., Tokyo, Japan under the designation "Resin M Grade S-2".

The hardeners used in the Examples are prepared as follows:

Hardeners I to XX are prepared by one of two general procedures:

Procedure A

To a solution of the polymeric phenol in an organic solvent is added a solution of the polyamine in the same organic solvent. The resulting precipitate is filtered off, washed first with the reaction solvent and then with ether, and dried under vacuum at 50° C. The resulting solid is ground to a fine powder.

Procedure B

The polymeric phenol is melted and stirred at 180° C. The The polyamine is added gradually, the mixture being stirred until a clear liquid is obtained. The liquid is poured onto aluminium foil and allowed to cool to form a solid which is broken up and ground to a fine powder.

Hardener I, having an amine content of 5.43 equivs./kg, is prepared by Procedure A using Polymeric Phenol I (40 g) in isopropanol (300 ml) and triethylenetetramine (10 g) in isopropanol (50 ml).

Hardener II is prepared by Procedure B using Polymeric Phenol II (100 g) and triethylenetetramine (25 g).

Hardener III is prepared by Procedure B using Polymeric Phenol II (100 g) and N-(2-aminoethyl)piperazine (45 g).

Hardener IV, having an amine content of 5.18 equivs./kg, is prepared by Procedure A using Polymeric Phenol (5 g) in isopropanol (25 g) and diethylenetriamine (2 g) in isopropanol (10 g).

Hardener V, having an amine content of 5.05 equivs./kg is prepared by Procedure A using Polymeric Phenol I (5 g) in isopropanol (25 g) and N-(2-aminoethyl)-1,3-propanediamine (2 g) in isopropanol (10 g).

Hardener VI, having an amine content of 4.92 equivs./kg, is prepared by Procedure A using Polymeric Phenol I (5 g) in isopropanol (25 g) and dipropylenetriamine (2 g) in isopropanol (10 g).

Hardener VII, having an amine content of 4.92 equivs./kg, is prepared by Procedure A using Polymeric Phenol I (5 g) in isopropanol (25 g) and N,N-bis(3-aminopropyl)methylamine (2 g) in isopropanol (10 g).

Hardener VIII, having an amine content of 2.51 equivs/kg, is prepared by procedure A using Polymeric Phenol I (5 g) in isopropanol (25 g) and bis(4-aminocyclohexyl)methane (2 g) in isopropanol (10 g).

Hardener IX, having an amine content of 4.32 equivs./kg, is prepared by Procedure A using Polymeric Phenol I (5 g) in isopropanol (25 g) and tris(2-aminoethyl)amine (2 g) in isopropanol (10 g).

Hardener X is prepared by Procedure B using Polymeric Phenol II (100 g) and diethylenetriamine (25 g).

Hardener XI is prepared by Procedure B using Polymeric Phenol III (100 g) and a polyaminoamide made from dimerised linoleic acid and triethylenetetramine available from Cray Valley Products Ltd., Orpington, Kent, England under the designation Versamid 140 (100 g).

Hardener XII is prepared by Procedure B using Polymeric Phenol II (100 g) and a polyethyleneimine having a number average molecular weight of 1650 to 1950 available from Dow Chemical Company under the designation Polyethyleneimine PEI-18 (25 g).

Hardener XIII is prepared by Procedure B using Polymeric Phenol III (100g) and triethylenetetramine (25 g ).

Hardener XIV is prepared by Procedure B using Polymeric Phenol IV (75 g) and m-xylylenediamine (25 g).

Hardener HV, having an amine content of 4.25 equivs./kg, is prepared by Procedure A using Polymeric Phenol II (5 g) in methanol (15 g) and N-(2-aminoethyl)-1,3-propanediamine (2 g) in methanol (10 g).

Hardener XVI, having an amine content of 3.68 equivs./kg, is prepared by Procedure A using Polymeric Phenol II (5 g) in methanol (15 g) and tris(2-aminoethyl)amine (2 g) in methanol (10 g).

Hardener XVII, having an amine content of 2.08 equivs./kg, is prepared by Procedure A using Polymeric Phenol II (5 g) in methanol (15 g) and bis(4-aminocyclohexyl)methane (2 g) in methanol (10 g).

Hardener XVIII is prepared by Procedure B using Polymeric Phenol V (40 g) and triethylenetetramine (10 g).

Hardener XIX is prepared by Procedure B using Polymeric PHenol IV (40 g) and m-xylylenediamine (10 g).

Hardener XX is prepared by Procedure B using Polymeric Phenol II (100 g) and N-(2-aminoethyl)piperzine (55 g).

Hardener XXI

Polymeric Phenol VI (10 g) and isophorone diamine (10 g) are stirred together at ambient temperature to give a slurry. This slurry is slowly heated to 140° C., whilst stirring is maintained. It is kept at 140° C. for 5 minutes, at which temperature the mixture is a clear, mobile liquid, and then it is poured into aluminium trays to cool. The resultant brittle solid is ground to a powder.

Hardener XXII m-Xylylenediamine (3 g) is heated to 140° C. and Polymeric Phenol VI (6 g) is added with stirring in small portions. The reaction mixture is held at 140° C. for 15 minutes and then at 150° C. for 15 minutes to produce a clear melt, which is poured into an aluminium tray to cool. The resulting brittle solid is ground to a powder.

Hardener XXIII is prepared by Procedure B hereinbefore described using Polymeric Phenol II (100 g) and N-(2-aminoethyl)-piperazine (25 g).

In the following Examples, parts are by weight unless stated otherwise.

EXAMPLES 1-20

Curable compositions are prepared by dispersing one of Hardeners I to XX in a diglycidyl ether of bisphenol A having an epoxide content of 5.2 equivalents/kg using a triple roll mill. The gelation times of the compositions at particular temperatures are measured by placing approximately 0.1 g of each composition onto a metal block heated at the required temperature and observing the time taken for gelation to occur. The compositions are kept at ambient temperature (25° C.) in order to determine their storage life.

The nature and amount of hardener in the compositions, together with the gel times and storage lives of the compositions, are given in Table 1.

TABLE 1

| Ex. | Hardener | Amount[1] | Gel time (min.) 80° C. | 100° C. | 120° C. | Storage life |
|---|---|---|---|---|---|---|
| 1 | I | 50 | 2 | — | — | More than 2 years |
| 2 | II | 50 | — | — | 0.5 | More than 1 year |
| 3 | III | 70 | 15 | — | — | 6 months |
| 4 | IV | 50 | 4 | — | — | 1 year |
| 5 | V | 50 | 2 | 1.3 | 0.6 | 6 weeks |
| 6 | VI | 50 | 4 | — | — | More than 1 year |
| 7 | VII | 50 | 2 | 0.5 | — | 10 months |
| 8 | VIII | 120 | 1.8 | 1.2 | 1 | 2 weeks |
| 9 | IX | 85 | 1.8 | 1.2 | 0.6 | 6 weeks |

TABLE 1-continued

| Ex. | Hardener | Amount[1] | Gel time (min.) 80° C. | 100° C. | 120° C. | Storage life |
|---|---|---|---|---|---|---|
| 10 | X | 50 | — | 5 | — | 1 year |
| 11 | XI | 100 | — | — | 1 | 1 year |
| 12 | XII | 100 | — | — | 1 | More than 1 year |
| 13 | XIII | 50 | 2 | — | — | 4 weeks |
| 14 | XIV | 72 | 2 | — | — | More than 1 year |
| 15 | XV | 75 | 15 | 1 | 0.75 | 3 months |
| 16 | XVI | 100 | 7 | 1.3 | 1 | 5 months |
| 17 | XVII | 120 | 10 | 1 | 0.75 | 2 weeks |
| 18 | XVIII | 50 | — | — | 0.5 | 1 month |
| 19 | XIX | 90 | 2 | — | — | More than 1 year |
| 20 | XX | 70 | 5 | — | — | 4 months |

[1]Parts of hardener per 100 parts of the diglycidyl ether

EXAMPLES 21-23

Curable compositions are prepared by dispersing one of hardeners XXI to XXII in a mixture of a diglycidyl ether of bisphenol A having an epoxide content of 5.2 equivalents/kg as the epoxide resin and highly dispersed silica. In Example 23 using Hardener XXIII the silica is omitted. The gelation times of the compositions at particular temperatures and their storage lives are determined as in Examples 1-20.

The nature and amounts of the components of the compositions, with the gel times and storage lives of the compositions, are given in Table 2.

TABLE 2

| Ex. | Ingredient | Amount (Parts) | Gel time (min) 80° C. | 100° C. | Storage Life |
|---|---|---|---|---|---|
| 21 | Epoxide resin | 100 | | | |
| | Hardener XXI | 40 | 14.5 | 2.5 | More than 3 months |
| | Silica | 4 | | | |
| 22 | Epoxide resin | 100 | | | |
| | Hardener XXII | 54 | 5.5 | 0.8 | More than 5 weeks |
| | Silica | 4 | | | |
| 23 | Epoxide resin | 100 | | | |
| | Hardener XXIII | 50 | — | 2 | More than 1 year |

The composition of Example 23 gels in 1.25 minutes at 120° C.

EXAMPLE 24

The composition of Example 1 (2 g) is placed in a small polyethylene mould and heated at 60° C. The composition gels in 20 minutes.

EXAMPLE 25

The composition of Example 4 (1 g) is placed in small polyethylene mould and heated at 60° C. The composition gels in 30 minutes.

EXAMPLE 26

The composition of Example 1 is used to produce single lap joints 12.5 mm×25 mm using degreased and pickled aluminium alloy (2L 73Alclad)sheets. The composition is cured by heating at 80° C. for 2 hours. The shear strength of the joint is 13 MPa.

EXAMPLE 27

Example 26 is repeated using the composition of Example 2 and curing at 120° C. for 1 hour. The shear strength of the joint is 17.6 MPa.

EXAMPLE 28

Example 26 is repeated using the composition of Example 3 and curing at 80° C. for 2 hours. The shear strength of the joint is 14 MPa.

EXAMPLE 29

A diglycidyl ether of bisphenol A having an epoxide content of 5.2 equivalents/kg (10 g) and hardener III (7 g) are blended on a triple roll mill. Some of the resulting mixture is used to fill a mould of dimensions 75 mm × 25 mm × 3 mm and is cured for 1 hours at 80° C. The resulting cured casting has a flexural strength of 70.4 MN/m².

EXAMPLE 30

Example 29 is repeated, using Hardener II (5 g) in place of Hardener III and curing for 1 hour at 120° C. The resulting cured casting has a flexural strength of 96.7 MN/m².

What is claimed is:

1. A storage stable latent curable liquid composition comprising
   (A) a liquid epoxide resin and
   (B) at least one latent curing agent for (A), said latent curing agent comprising more than 10% by weight, based on the weight of (A), of a solid solution of a polymeric phenol having, per average molecule, more than two repeating units, each of which has at least one phenolic hydroxy group and at least one polyamine having at least 2 amino groups, at least one of which is a primary amino group, said solid solution being dispersed as a powder in the epoxide resin.

2. A composition according to claim 1, in which the epoxide resin (A) is a polyglycidyl ether, a polyglycidyl ester, a N,N'-diglycidylhydantoin or a poly(N-glycidyl) derivative of an aromatic amine.

3. A composition according to claim 1, in which the polymeric phenol is a homopolymer or copolymer of a phenol substituted by a polymerisable ethylenically unsaturated group, or a phenolic novolak resin.

4. A composition according to claim 3, in which the polymeric phenol has the general formula

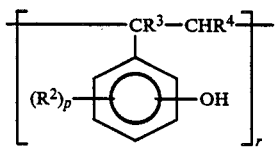

II where
R² represents a halogen atom or a hydroxy, alkyl, alkoxy, aryl, aralkyl or hydroxyaralkyl group,
R³ and R⁴ are the same or different and each represents a hydrogen atom or a straight chain or branched alkyl group having from 1 to 4 carbon atoms,
p represents zero or an integer of from 1 to 4, and
r represents an integer such that the average molecular weight of the polymer is within the range 1500–30,000.

5. A composition according to claim 4, in which R² represents a halogen atom, R³ and R⁴ represent hydrogen atoms and p represents zero or 1.

6. A composition according to claim 3, in which the polymeric phenol is a phenolic novolak resin prepared from a mononuclear phenol and an aldehyde.

7. A composition according to claim 6, in which the novolak resin is of formula

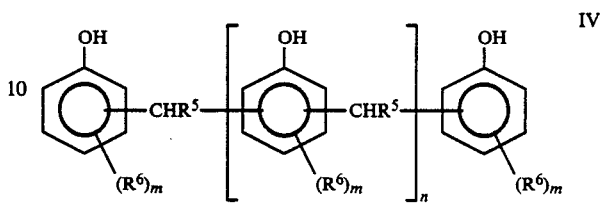

IV where
R⁵ represents a hydrogen atom or an alkyl or aryl group,
R⁶ represents an alkyl group of 1 to 10 carbon atoms,
m represents zero or an integer of 1 to 3, and
n represents an integer having an average value within the range 1 to 20.

8. A composition according to claim 7, in which n denotes an integer having an average value from 1 to 10,
R⁵ represents hydrogen and
m denotes zero or
m denotes 1 and each R⁶ denotes an alkyl group of 1 to 4 carbon atoms or
m denotes zero for some of the indicated aromatic rings in formula IV and denotes 1 for the remainder, R⁶ denoting an alkyl group of 1 to 4 carbon atoms.

9. A composition according to claim 3, in which the polymeric phenol is a phenolic novolak resin prepared from a bisphenol and an aldehyde.

10. A composition according to claim 9, in which the novolak resin is prepared from bisphenol A and formaldehyde.

11. A composition according to claim 1, in which the solid solution (B) is prepared from a polyamine having at least 2 primary amine groups, or one primary amine group and at least one secondary amine group.

12. A composition according to claim 11, in which the polyamine is a polyalkylenepolyamine, an aralkylenediamine, or aminoalkylalkylenediamine, a N,N-bis(aminoalkyl)alkylamine, a tris(aminoalkyl) amine, a cycloaliphatic diprimary amine, an N-aminoalkylpiperazine, a polyalkyleneimine or a polyaminoamide.

13. A composition according to claim 12, in which the polyamine is diethylenetriamine, triethylenetetramine, dipropylenetriamine, m-xylyenediamine, N-(2-aminoethyl)-1,3-propanediamine, N,N-bis(3-aminopropyl)methylamine, tris(2-aminoethyl)amine, bis(4-aminocyclohexyl)methane, isophoronediamine, N-(2-aminoethyl)piperazine, a polyethyleneimine having a molecular weight of 1650 to 1950 or a polyaminoamide formed from triethylenetetramine and dimerised linoleic acid.

14. A composition according to claim 1, in which the solid solution (B) is of a polymer of a phenol substituted by a polymerisable ethylenically unsaturated group, or a phenolic novolak resin, with a polyamine having at least 2 primary amine groups, or one primary amine group and at least one secondary amine group.

15. A composition according to claim 14, in which the solid solution (B) is of the polyamine with a novolak resin prepared from bisphenol A and formaldehyde.

16. A composition according to claim 1, in which the weight ratio of polymeric phenol to polyamine in the solid solution (B) is within the range 0.5:1 to 5:1.

17. A composition according to claim 1, which contains from 15 to 150% of the solid solution (B) by weight of the epoxide resin (A).

18. A composition according to claim 1, cured by heating.

19. A composition according to claim 18 cured by heatng at a temperature from 60° C. to 200° C.

20. A method of bonding or sealing two surfaces together which comprises applying a composition according to claim 1 to one or both surfaces, placing the two surfaces together with the composition positioned therebetwen to form an assembly and heating the assembly until the composition is cured.

* * * * *